United States Patent

[11] 3,603,436

[72] Inventor Robert J. Bartholomew
        Logan, Ohio
[21] Appl. No. 860,656
[22] Filed Sept. 24, 1969
[45] Patented Sept. 7, 1971
[73] Assignee Anchor Hocking Corporation
        Lancaster, Ohio

[54] ONE-POSITION CLUTCH
    5 Claims, 6 Drawing Figs.
[52] U.S. Cl. .................................................. 192/46,
        192/67 R, 192/108, 192/109 R
[51] Int. Cl. ..................................................... F16d 11/04
[50] Field of Search ........................................... 192/46, 67,
        108, 109; 64/29

[56] References Cited
UNITED STATES PATENTS
2,145,083  1/1939  Dynes ........................... 64/29 UX
2,983,122  5/1961  Polzin ........................... 64/29
FOREIGN PATENTS
122,348  1/1919  Great Britain ................ 192/108
426,659  11/1947  Italy ............................. 192/67

Primary Examiner—Allan D. Herrmann
Attorney—Norman N. Holland

ABSTRACT: A clutch for physically connecting and disconnecting driven elements. The clutch includes a driving clutch element which releasably engages a driven clutch element which releasably engages a driven clutch element by means of a pair of coupling lugs and slots on the two elements which are so arranged that the clutch is always reengaged with the driving and driven members in the same rotational position.

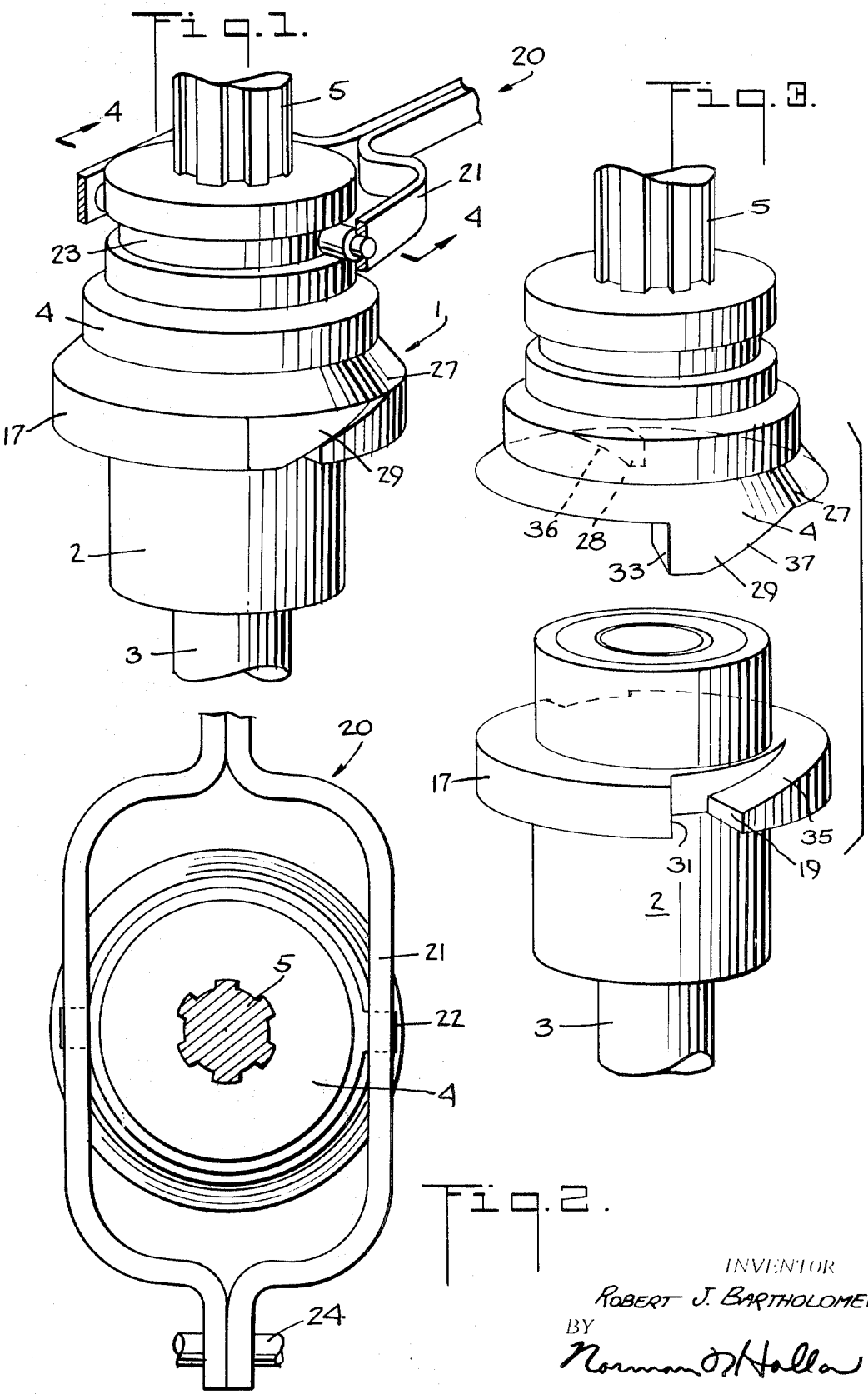

INVENTOR.
ROBERT J. BARTHOLOMEW
BY Norman O. Hallan
ATTORNEY

ONE-POSITION CLUTCH

BACKGROUND OF THE INVENTION

The present invention relates to a coupling device for a mechanical drive system of the type utilized for connecting nand disconnecting synchronized machinery to a drive system where it is necessary to always reconnect the machinery at the same rotational position with respect to the driving means. One example where a clutch in accordance with this invention is used is where a takeout device is removing completed articles, such as molded glass articles, from a molding machine. The drive means for the takeout device is normally connected to the driving mechanism of he manufacturing machine to synchronize the two devices. It is necessary, however, to occasionally completely disconnect the takeout device while the machine continues to run. For this purpose and in order to maintain the necessary synchronizing movement between the takeout device and the manufacturing machine, it is necessary to always reengage the takeout device at a precise portion of the machine cycle and thus at a preset position with respect to the shaft or other member which couples the takeout device to the manufacturing machine.

The clutch in accordance with the present invention accomplishes this result and at the same time provides a novel rugged and shock-resistant clutch for coupling and uncoupling the driving and driven members accurately and positively and including relatively large power transfers.

Prior clutches of this general type are known where the recoupling provides for a restoration of the original rotational positions between driving and driven shafts. However, these prior devices are relatively complex and usually include several moving parts and in most cases are not capable of transmitting large amounts of torque or resisting the jolts or abrupt power changes typical of many machines for which such a clutch is useful.

Accordingly, an object of the present invention is to provide an improved one-position clutch.

Another object of the invention is to provide a one-position clutch capable of transmitting relatively high amounts of torque and which is able to withstand sharp changes in driving torque or jolts in power transmission.

Another and further object of the invention is to provide a one-position clutch which is readily engaged and disengaged and which precisely reestablishes the relative positions of the driving and driven members when reengaged.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 1 is a perspective view of a preferred embodiment of the one-position clutch in its engaged and driving position.

FIG. 2 is a top plan view of the clutch of FIG. 1.

FIG. 3 is a perspective view of the clutch of FIG. 1 in its open or disengaged position.

DESCRIPTION OF THE PREFERRED EMBODIMENT

Figure 4:
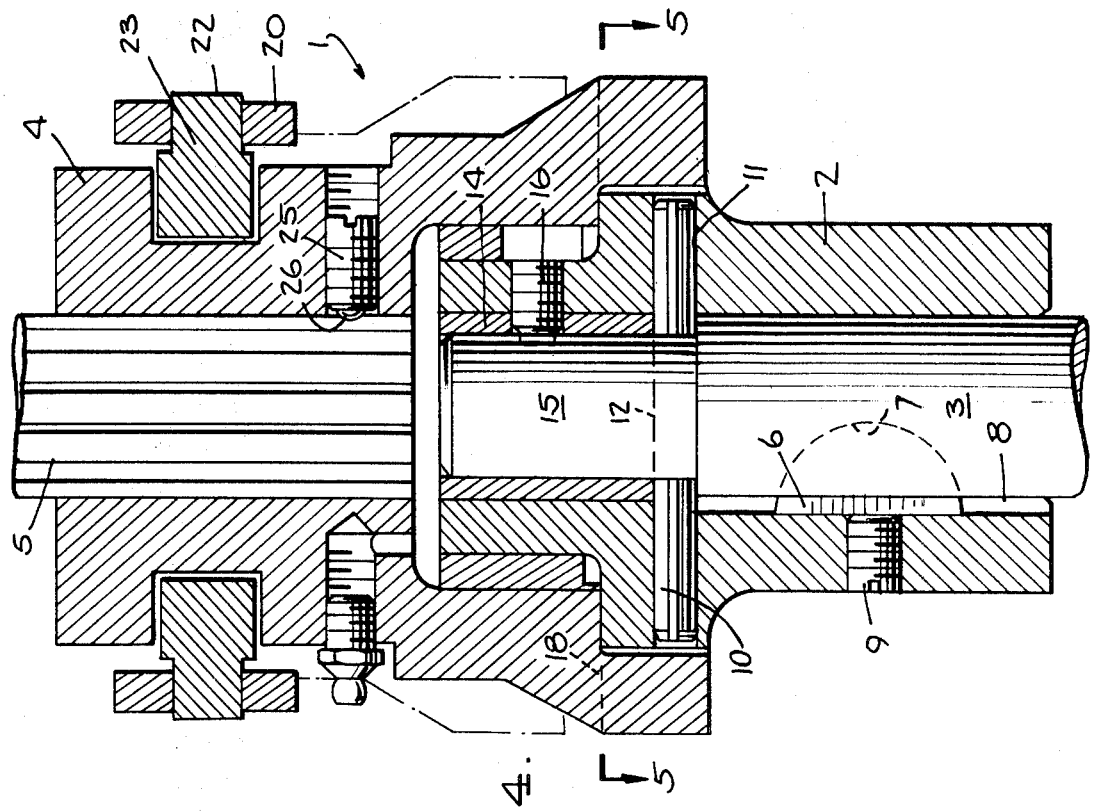
FIG. 4 is a vertical sectional view of the clutch taken along line 4—4 on FIG. 1.

The drawing illustrates a preferred embodiment of the clutch 1 having its driving member 2 attached to the end of a drive shaft 3 and its driven member 4 coupled to a driven shaft 5. The coupling between the driving member 2 and the driving shaft 3 is best illustrated in FIG. 4. The driving member 2 is coupled to the driving shaft 3 for rotation therewith by means of a key 6 engaging a rounded slot 7 in the drive shaft 3 and an elongated keyway 8 formed in the driving member 2. The key 6 is held in position by means of a setscrew 9. This coupling causes the driving member 2 to rotate with the drive shaft 3 but permits relative axial movement between the shaft and the driving clutch member 2 to provide for a cushioning between the driving clutch member 2 and the driven clutch member 4.

The driving clutch member 2 is resiliently coupled axially of the driving shaft 3 for this purpose by means of a flexible spring pin 10 inserted into cooperating apertures 11 in the driving member 2 and 12 in the driving shaft 3. It will be seen that upon engagement or closing the clutch that a slight axial movement of the driving member 2 is permitted as the driven member 4 moves into engagement with it and that this cushioning action provides for a smoother clutch engagement and also protects the clutch members against damage by minimizing any axial shocks which might occur when the clutch is closed. This protective movement of the driving member 2 is facilitated by the inclusion of a bearing 14 between the reduced end portion 15 of the driving shaft 3 and the driving member 2. The bearing 14 is held in position with respect to the driving member 2 by a suitable setscrew 16. The driving member 2 is seen to have a radially directed coupling flange 17 which includes a pair of coupling notches 18 and 19 which cooperate with the driven clutch member 4 as will be more fully described below.

The driven clutch member 5 is slidably mounted for axial movement on the splined driven shaft 5 which permits the driven clutch member 4 to be moved towards and away from the clutch drive member 2 during clutch engagement and disengagement. This axial movement of the driven member 4 is accomplished by means of the clutch control handle 20 which has its forked inner end 21 pivotally connected at 22 to a coupling ring 23 which slidably encircles the driven member 4. The clutch handle 20 is pivotally attached to an external support such as a mounting pin 24 (FIG. 2) to provide the axial movement when the clutch handle 20 is raised or lowered by the clutch operator. The driven clutch member 4 is releasably locked in its closed position by means of a spring-loaded ball-plunger 25 (FIG. 4) which engages an appropriately positioned detent 26 in the splined driven shaft 5.

The driven clutch member 4 also includes an outwardly extending coupling flange 27 which includes two-spaced coupling lugs 28 and 29 for engaging the correspondingly positioned coupling notches 18 and 19 in the driving member 2. The notches include flat and axially directed coupling surfaces 30 and 21 for engagement with corresponding flat and axially aligned engaging surfaces 32 and 33 on the lugs of the driven member 4. In order to facilitate the reengagement of the clutch by providing for a smooth reengaging action, the sides of the notches 18 and 19 and of the lugs 28 and 29 opposite to the flat faces 30–33 are sloped or inclined at generally smaller angles in the manner best illustrated at 34–37 in FIG. 3.

Figure 5:
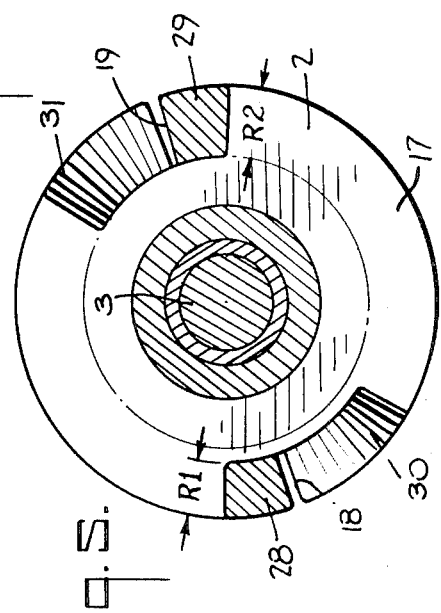
FIG. 5 is a horizontal sectional view of the clutch taken along line 5—5 on FIG. 4.
Figure 6:
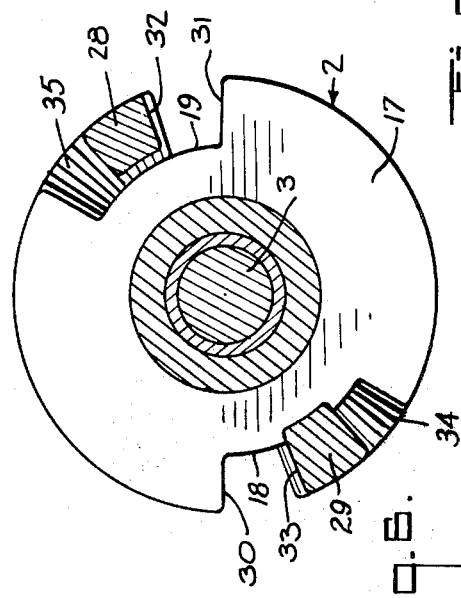
FIG. 6 is a horizontal sectional view corresponding to FIG. 5 with the clutch in its open position corresponding to the dash-dot position of the clutch illustrated in FIG. 4.

In order to provide for an even loading and a smooth torque transmission two lugs and two correspondingly positioned slots are provided on the driven and the driving clutch elements 2 and 4 respectively. The one-position clutch engaging action, as described above, whereby the shafts 1 and 3 are always recoupled in the same relative rotational positions is obtained by having one lug 28 and its corresponding slot 18 formed with a lesser radial dimension R1 than the radial dimension R2 of the opposite lug 29 and slot 19 (FIG. 5). This arrangement permits the lug 19 to only enter its corresponding slot 29 and prevents this lug 19 from entering the opposite shorter slot 28 as is clearly illustrated in FIG. 6 which corresponds to an open position of the clutch 1.

It will be seen that an improved one-position clutch has been provided which combines smooth, high power torque transmission with a rugged and simplified means for disengaging and reengaging the clutch and for limiting the reengagement to a single relative position of the driving and driven shafts. The improved clutch accomplishes this result using relatively simple yet effective driving and driven clutch members which are formed by straightforward manufacturing operations and which do not require use of any complicated or intricate moving parts for either providing the coupling action or for providing the shaft positioning action.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An improved one-position clutch for detachably coupling a driven shaft to a driving shaft comprising the combination of a driving member coupled to said driving shaft for rotation therewith, a driven member coupled to said driven shaft for rotation therewith, means for providing relative movement of said members axially of the shafts to which they are coupled for engagement and disengagement with each other, engagement means on said members for releasably connecting and disconnecting them rotationally as a result of said axial movement comprising a pair of circumferentially spaced notches and a pair of correspondingly spaced lugs proportioned to removably enter said notches upon said relative axial movement, said lugs and said notches each having a generally axially aligned surface and a surface aligned at an angle to said axially aligned surface, one of said notches having a shorter radial length than the other notch and one of said lugs whereby said member can only be reengaged with the said shafts in one rotational position relative to each other, and a bearing positioned intermediate one of said members and its mounting shaft, a key coupling said one member to its mounting shaft for rotational movement therewith and permitting axial movement of sad one member along its mounting shaft, and a resilient member yieldably holding said one member against axial movement.

2. The clutch as claimed in claim 1 which further comprises an operating handle pivotally coupled to a ring slidably engaging one of said members.

3. The clutch as claimed in claim 1 in which said resilient member comprises a flexible pin.

4. The clutch as claimed in claimed in claim 1 in which said bearing comprises a hollow sleeve coupled to said driven member.

5. The clutch as claimed in claim 1 in which the coupling between said driven member and said driven shaft comprises splines on said driven shaft and cooperating splines on said driven member.